United States Patent [19]

Inoue

[11] Patent Number: 4,720,616
[45] Date of Patent: Jan. 19, 1988

[54] POLARITY REVERSAL PULSING METHOD AND APPARATUS FOR EDM

[75] Inventor: Kiyoshi Inoue, Tokyo, Japan

[73] Assignee: Inoue-Japax Research Incorporated, Tokyo, Japan

[21] Appl. No.: 767,326

[22] Filed: Aug. 21, 1985

[30] Foreign Application Priority Data

Aug. 21, 1984 [JP] Japan .................................. 59-173763

[51] Int. Cl.$^4$ ............................................... B23H 1/02
[52] U.S. Cl. ............................... 219/69 P; 204/129.43; 204/224 M; 219/69 M
[58] Field of Search .................. 219/69 P, 69 G, 69 C, 219/69 M; 204/129.25, 129.43, 224 M

[56] References Cited

U.S. PATENT DOCUMENTS

| | | | |
|---|---|---|---|
| 2,951,930 | 9/1960 | McKechnie | 219/69 C |
| 3,020,448 | 2/1962 | Fefer | 219/69 P |
| 3,357,912 | 12/1967 | Inoue | 219/69 P |
| 3,558,998 | 1/1971 | Bertolasi | 219/69 C |
| 3,654,116 | 4/1972 | Inoue | 204/224 M |
| 3,916,138 | 10/1975 | Pfau | 219/69 P |
| 3,943,321 | 3/1976 | Pfau et al. | 219/69 P |
| 4,056,702 | 11/1977 | Bell, Jr. et al. | 219/69 C |
| 4,310,741 | 1/1982 | Inoue | 219/69 C |
| 4,320,278 | 3/1982 | Bell, Jr. et al. | 219/69 G |
| 4,347,425 | 8/1982 | Ohara | 219/69 P |
| 4,447,696 | 5/1984 | Niwa | 219/69 P |
| 4,582,974 | 4/1986 | Itoh | 219/69 P |

FOREIGN PATENT DOCUMENTS

| | | |
|---|---|---|
| 0027041 | 3/1980 | European Pat. Off. . |
| 47-46156 | 11/1972 | Japan ................... 219/69 C |
| 145195 | 12/1978 | Japan ................... 219/69 P |
| 59-53123 | 3/1984 | Japan ................... 219/69 C |
| 59-93228 | 5/1984 | Japan ................... 219/69 C |

Primary Examiner—A. D. Pellinen
Assistant Examiner—Geoffrey S. Evans
Attorney, Agent, or Firm—Finnegan, Henderson, Farabow, Garrett and Dunner

[57] ABSTRACT

An EDM method and apparatus in which a succession of machining voltage pulses of regular polarity is applied from a first pulse supply between a tool electrode and a workpiece to produce erosive discharges across the EDM gap in the presence of a water flushing medium. A second pulse supply is also provided to apply one or more voltage pulses of reverse polarity during a time interval between successive machining voltage pulses of regular polarity across the EDM gap. A sensing circuit is provided to respond to a gap open-circuit condition and to provide an output signal representative thereof. The output signal is used to act on the second pulse supply so as to selectively trigger such one or more reverse-polarity pulses, or to temporarily modify the parameters of the reverse-polarity pulse or pulses, upon occurrence of the gap open-circuit condition.

4 Claims, 1 Drawing Figure

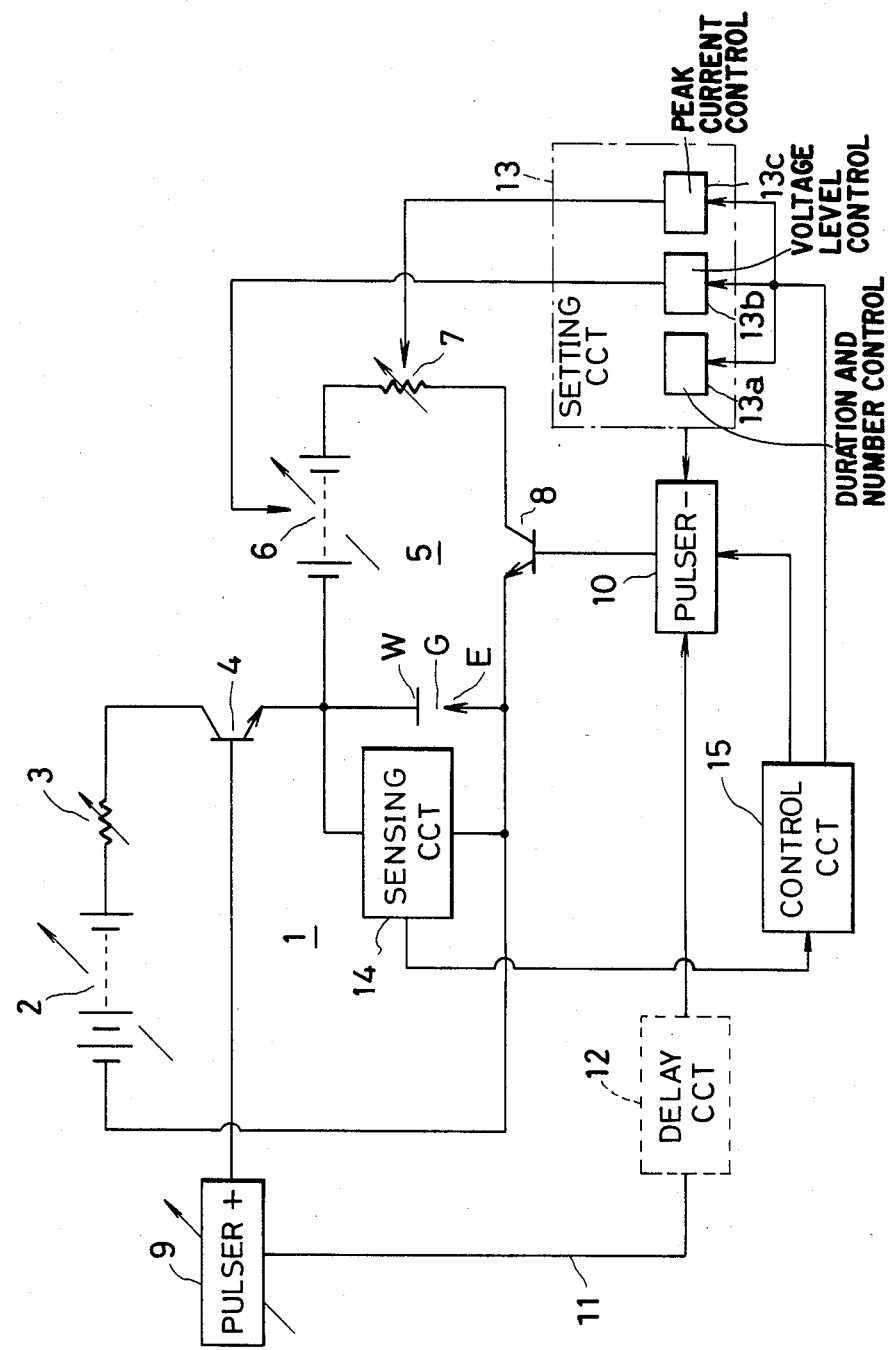

POLARITY REVERSAL PULSING METHOD AND APPARATUS FOR EDM

FIELD OF THE INVENTION

The present invention relates to electrical discharge machining (EDM) utilizing a water machining fluid and, more particularly, to a new and improved method of and apparatus and power supply circuit arrangement for performing such EDM operations.

BACKGROUND OF THE INVENTION

The use of water or a water-based machining fluid has become increasingly important in the EDM art. Such fluids are generally inexpensive and offer relatively high removal rate at some cost of electrode wear. In addition, they are free from the danger of a fire unlike conventional hydrocarbon EDM media such as transformer oil and kerosene. Thus, the practical use of water as the EDM medium first occurred and is now common in traveling-wire (TW) EDM machines where the gap is placed directly in the air and the electrode wear is less significant. The water is commonly deionized water which may incorporate one or more organic components to substantially enhance discharge stability and also to reduce the electrode wear. The capability of wear reduction has now proved the use of such a water fluid to be also advantageous in sinking or generic electrode EDM machines where the tool electrode is a formed or simple electrode to machine a workpiece into a desired three-dimensional shape.

One significant problem arises, however, in the use of a water fluid in EDM processes and is the problem of corrosion or electrochemical attack of the machined surface. This is particularly noticeable when the workpiece is composed of a cemented carbide material such as WC-Co. The cobalt binder has a relatively high electrochemical solubility and thus tends to preferentially dislodge during an EDM operation. As a result, pits or localized irregular formations tend to develop on the machined surface and damage the quality thereof. Such phenomena are generally experienced when the workpiece is a metallic carbide, boride or alloy of high hardness in which a metal of relatively high electrochemical solubility such as Fe, Ni, Cr, Cu, Co, Zn, Al, Cd, Mn, Sn or Sb is a binder or alloy component.

It is known that this problem can be alleviated by providing a power supply circuit arrangement in which each of the machining voltage pulses is of regular polarity with the workpiece being poled positive and the tool electrode being poled negative to cause erosive gap discharges and where each of the machining voltage pulses is followed by an auxiliary pulse of the reverse polarity effected across the gap to make the tool electrode positive and the workpiece negative. While such known arrangements have proven to generally limit the corrosion phenomena, however, it has been found that not only does the alternate polarity reversal reduce the power efficiency, the reverse polarity pulses applied in such a mode tend to adversely affect the regular polarity machining pulses and to unstabilize the resulting erosive discharges.

OBJECTS OF THE INVENTION

Accordingly, the present invention seeks to provide a new and improved electrical discharge machining method whereby the problem of electrochemical actions on a machined surface in an EDM process utilizing a water machining fluid is overcome efficiently and effectively while maintaining the stability of erosive discharges and machining performance at maximum, and also to provide a circuit arrangement for carrying out the method described.

SUMMARY OF THE INVENTION

The present invention is based upon the discovery that it is generally the mean gap voltage of the machining pulses provides an indication of the magnitude of electrochemical action in a given time period causing the corrosion and localized irregular formations on the EDM surfaces in contact with the water fluid but that the mean gap voltage itself does not necessarily dictate the the EDM efficiency. However, a gap open-circuit condition can be interpreted as an indication of both of a lack of the EDM action and a development of the adverse electrochemical actions. The gap open-circuit condition significantly contributes to the mean gap voltage and hence the degree of the electrochemical action, and also provides a proper indication of a lack or drop of the EDM action and efficiency.

In accordance with the present invention there is provided, in a first aspect thereof, a method of machining a conductive workpiece by means of electroerosive discharges effected across a machining gap between a tool electrode and the workpiece in the presence of a water machining fluid wherein a succession of voltage pulses of regular polarity is applied across the gap between the workpiece and the tool electrode to produce such discharges and at least one pulse of the reverse polarity having predetermined pulse time, amplitude and number parameters is applied across the gap between the workpiece and the tool electrode during a time interval between such succeeding regular-polarity pulses, the method comprising the steps of: (a) sensing the occurrence of a gap open-circuit condition resulting from the application of at least one of the regular-polarity pulses; and (b) in response to said condition, temporarily increasing at least one of said parameters of said reverse-polarity pulses subsequent to the occurrence of said condition.

According to another general feature of this aspect of the present invention there is provided a method of machining a conductive workpiece by means of electrical discharges effected across a machining gap between a tool electrode and the workpiece in the presence of a water machining fluid wherein a succession of voltage pulses of regular polarity is applied across the gap between the workpiece and the tool electrode to produce such discharges and at least one pulse of the reverse polarity having predetermined pulse time, amplitude and number parameters is applied across the gap between the workpiece and the tool electrode during a time interval between such succeeding regular-polarity pulses, the method comprising the steps of: (a) sensing the occurrence of a gap open circuit condition resulting from the application of at least one such regular-polarity pulses; and (b) in response to said condition, selectively impressing at least one such reverse-polarity pulse across said machining gap.

The invention also provides, in a second aspect thereof, an apparatus for machining a conductive workpiece by means of electroerosive discharges effected across a machining gap between a tool electrode and the workpiece in the presence of a water machining fluid, power supply means having a first pulse supply for applying a succession of voltage pulses of a regular polarity across the gap between the workpiece and the tool electrode to produce such discharges and a second pulse supply for applying across the gap at least one pulse of the reverse polarity during a time interval between such succeeding regular-polarity pulses, said means further comprising: setting means operatively associated with said second pulse supply and having pulse time, amplitude and number parameters of said reverse-polarity pulses adjustable; sensing the means connected to said gap for sensing occurrence of a gap open-circuit condition resulting from the application of at least one regular-polarity pulse and producing an output signal representative of the open-circuit condition; and a control circuit coupled to the setting means for temporarily increasing at least one of the parameters of the reverse-polarity pulses in response to the output signal.

According to another general feature of this aspect of the present invention there is provided an apparatus for machining a conductive workpiece by means of electro-erosive discharges effected across a machining gap between a tool electrode and the workpiece in the presence of a water machining fluid, power supply means having a first pulse supply for applying a succession of voltage pulses of regular polarity across the gap between the workpiece and the tool electrode to produce such discharges and a second pulse supply for applying at least one pulse of the reverse-polarity across the gap during a time interval between such succeeding regular-polarity pulses, said means further comprising;

setting means operatively associated with said second pulse supply and having pulse time, amplitude and number parameters adjustable; sensing means connected to said gap for sensing occurrence of a gap open-circuit condition resulting from application of at least one said regular-polarity pulse and producing an output signal representative of said condition; and a control circuit coupled to said second pulse supply for selectively impressing at least one said reverse-polarity pulse across said gap in response to said output signal.

BRIEF DESCRIPTION OF THE DRAWING

These and other features of the present invention as well as advantages thereof will become more readily apparent from the following description of certain embodiments thereof when taken with reference to the accompanying drawing.

The sole FIGURE is a circuit diagram illustrating power supply means according to the present invention.

DETAILED DESCRIPTION

Referring now to FIG. 1, a power supply circuit arrangement shown incorporates a tool electrode E and a conductive workpiece W. It will be appreciated that the electrode may be of any conventional EDM electrode form and can be a wire, tape or like traveling electrode, or a solid formed, electrode or simple or generic electrode.

As shown, the circuit arrangement includes a first (main) circuit 1 comprising a first voltage source 2 connected in series with a current limiting resistor 3, a power switch 4 (shown by a transistor), the tool electrode E and the workpiece W. The circuit arrangement further includes a second (auxiliary) circuit 5 comprising a second voltage source 6 in series with a current limiting resistor 7, a switch 8 (shown by a transistor), the tool electrode E and the workpiece W. The two series circuits 1 and 5 are connected in parallel to each other across an EDM gap G defined by the tool electrode E and the workpiece W. Of course, a single power source may be used to provide the two DC supplies 2 and 6.

The power switch 4 in the main circuit is turned on and off alternately by a pulsing circuit 9 to apply a succession of voltage pulses of regular polarity across the gap G with the workpiece W being poled positive and the tool electrode E being poled negative to produce intermittent electrical discharges between them. Such a succession of pulses may when originated in the pulsing circuit be in the form of a series of periodically interrupted trains of pulses so that groups of erosive discharges or composite erosive discharges are generated in succession and at intervals across the EDM gap G.

The DC source 2 has an adjustable voltage output to enable adjustment of the peak level of the machining voltage pulses. The resistor 3 is also adjustable to enable presetting of the peak current level of electrical discharges resulting from these pulses. The pulsing circuit includes a setting unit (not shown) for selectively adjusting the on-time and off-time of the machining voltage pulses or the resulting discharges. When a series of periodically or interrupted trains of control pulses is employed, the number of such pulses in each train and the time duration of each interruption are also made adjustable in the setting unit.

The switch 8 in the auxiliary circuit 5 is turned on and off by a pulsing circuit 10 to apply reverse-polarity voltage pulses across the gap G to make the tool electrode E poled positive and the workpiece W poled negative. A timing line 11 connecting an output of the pulsing circuit 9 to an input of the pulsing circuit 10 is provided so that each reverse-polarity pulse generated occurs during the time interval between successive machining voltage pulses and thus may not overlap with any of these pulses. The timing line 11 may include a delay network 12 so that the leading edge of the reverse-polarity, auxiliary pulse is spaced from the trailing edge of the preceding regular-polarity, machining pulse. The auxiliary DC source 6 has its output voltage adjustable so that the peak voltage of the reverse-polarity pulses may be variably set. The resistor 7 is also variable to enable setting of the peak current level of the reverse-polarity pulses.

Shown at 13 is setting means for variably establishing parameters of the reverse-polarity pulses, which include the duration and number, the voltage level and the peak current thereof. Thus, the setting means 13 can be divided into three units. A first unit 13a is associated with the pulsing circuit to set and change the number of such pulses to follow each or a given regular-polarity pulse as well as the duration of each reverse polarity pulse. A second unit 13b is associated with the auxiliary DC source 6 to permit the setting and change of the voltage level of the reverse-polarity pulses. A third unit 13c is associated with the variable resistor 7 to make the current level of the reverse-polarity pulses adjustable. The first, second and third setting units 13a, 13b and 13c are associated with the pulsing circuit 10, the adjustable DC source 6 and the variable resistor 7, respectively, to set and change the duration, the voltage level and the peak current of each reverse-polarity pulse that is to follow each or a given preceding regular-polarity pulse as well as the number of such pulses to be generated.

A sensing circuit 14 is operably coupled to the EDM gap to provide an output signal representing a gap open-circuit condition.

There are two basic forms in embodying the principles of the present invention. In the first form, the output signal of the sensing circuit 14 is furnished to a control circuit 15 that provides a control signal for selectively actuating and triggering the pulsing circuit 10 to provide one or a predetermined number of reverse-polarity pulses in response to the gap-open circuit condition. In this form, a reverse-polarity pulse will always follow a regular-polarity, machining pulse that is free from the gap open-circuit condition. In the second form, the output signal of the sensing circuit 14 may be applied via the control circuit 15 to the setting units 13a and/or 13c to increase the time duration and reverse-polarity pulse and/or the number of such pulses. The output signal of a sensing circuit 14 may also be applied to modify the voltage level and the peak current of one or more reverse-polarity pulses in response to the occurrence of the gap open-circuit condition. In a normal condition free from the gap open-circuit condition, the number of parameters of the reverse polarity pulses which is controlled is held at a minimum.

The term "gap open circuit condition" is used herein to refer to a condition in which an applied machining voltage pulse fails to effect an electrical discharge substantially at all across the machining gap and also includes a condition in which only a small proportion of regular-polarity voltage pulses applied in a selected unit time results in electrical discharges across the gap. Such a condition, which is characterized by a relatively high mean gap voltage, provides an adequate indication of both a lack of the EDM action and the development of the adverse electrochemical action.

The gap open-circuit condition can be measured for each machining voltage pulse applied, or alternatively over a number of such pulses applied during a selected unit time period.

A gap open circuit pulse is a pulse that fails to produce an erosive discharge and can be ascertained to be so if the voltage fails to drop to a discharge voltage level. This can be achieved, for example, by providing a monitoring time period during each applied voltage pulse, e.g., at the end portion thereof, and monitoring the voltage in such a period with respect to a certain threshold level above the discharge voltage level. If the voltage remains above the threshold level, the pulse is determined to be a gap open-circuit pulse.

Monitoring can also be carried out for a series of applied voltage pulses to determine the occurrence of a gap open-circuit condition. In this case, each of such pulses is monitored as to whether it is a gap open-circuit pulse. A counter may be provided in the sensing circuit 14 to count such pulses and to provide an output signal when the number of these pulses per the total number of the applied pulses for a given monitoring time period exceeds a preset level. It is also possible that the sensing circuit 14 measures the average gap voltage of the regular-polarity voltage pulses or integrates these voltage pulses in a given monitoring period to provide an output signal representing a gap open circuit condition when the measured average voltage exceeds a preset threshold level.

What is claimed is:

1. A method of machining a conductive workpiece by means of electroerosive discharges effected across a machining gap between a tool electrode and the workpiece in the presence of a water machining fluid wherein a succession of voltage pulses of regular polarity is applied across the gap between the workpiece and the tool electrode to produce such discharges and at least one pulse of reverse polarity having variable parameters including pulse width, amplitude and number of pulses occurrences of the reverse-polarity pulses is interposed during a time interval between succeeding regular-polarity pulses, the method comprising the steps of:
   (a) sensing the occurrence of a gap open-circuit condition resulting from the application of at least one such regular-polarity pulse; and
   (b) in response to said open-circuit condition, temporarily varying at least one of said parameters of said reverse-polarity pulses subsequent to the occurrence of said open-circuit condition.

2. A method of machining a conductive workpiece by means of electrical discharges effected across a machining gap between a tool electrode and the workpiece in the presence of a water machining fluid wherein a succession of voltage pulses of regular polarity is applied across the gap between the workpiece and the tool electrode to produce such discharges and at least one pulse of the reverse polarity having variable parameters including pulse width, amplitude and number of occurrences of the reverse-polarity pulses is interposed during a time interval between succeeding regular-polarity pulses, the method comprising the steps of:
   (a) sensing the occurrence of a gap open circuit condition resulting from the application of at least one regular-polarity pulse; and
   (b) in response to said gap open circuit condition, selectively impressing at least one reverse-polarity pulse across said machining gap.

3. In an apparatus for machining a conductive workpiece by means of electroerosive discharges effected across a machining gap between a tool electrode and the workpiece in the presence of a water machining fluid, power supply means having a first pulse supply for applying a succession of voltage pulses of regular polarity across the gap between the workpiece and the tool electrode to produce such discharges and a second pulse supply for applying across the gap at least one pulse of the reverse polarity during a time interval between such succeeding regular-polarity pulses, said means further comprising:
   setting means operatively associated with said second pulse supply for selectively setting variable parameters of the reverse-polarity pulses including the pulse width, amplitude and number of occurrences of said reverse-polarity pulses;
   sensing means connected to said gap for sensing the occurrence of a gap open-circuit condition resulting from the application of at least one of said regular-polarity pulses and producing an output signal representative of said condition; and
   a control circuit for controlling said setting means for temporarily varying at least one of said parameters of said reverse-polarity pulses in response to said output signal.

4. In an apparatus for machining a conductive workpiece by means of electroerosive discharges effected across a machining gap between a tool electrode and the workpiece in the presence of a water machining fluid, power supply means having a first pulse supply for applying a succession of voltage pulses of regular polarity across the gap between the workpiece and the tool electrode to produce such discharges and a second pulse supply for applying across the gap at least one pulse of the reverse-polarity during a time interval between succeeding regular-polarity pulses, said power supply means further comprising:

setting means operatively associated with said second pulse supply for selectively setting variable parameters of the reverse-polarity pulse including the pulse width, amplitude and number of occurrences of said reverse-polarity pulses;

sensing means connected to said gap for sensing the occurrence of a gap open-circuit condition resulting from the application of at least one of said regular-polarity pulses and for producing an output signal representative of said condition; and a control circuit coupled to said second pulse supply for selectively applying at least one of said reverse-polarity pules across said gap in response to said output signal.

* * * * *